United States Patent [19]

Parker et al.

[11] Patent Number: 4,510,520
[45] Date of Patent: Apr. 9, 1985

[54] TELEVISION TRANSMISSION SYSTEM

[75] Inventors: David W. Parker, Redhill, England; Leendert J. van de Polder, Eindhoven, Netherlands

[73] Assignee: U.S. Philips Corporation, New York, N.Y.

[21] Appl. No.: 456,236

[22] Filed: Jan. 7, 1983

[30] Foreign Application Priority Data

Jan. 25, 1982 [GB] United Kingdom ............... 8201998

[51] Int. Cl.³ ............................................. H04N 9/36
[52] U.S. Cl. ........................................ 358/12; 358/15
[58] Field of Search ................ 358/11, 12, 14, 15, 358/37, 310

[56] References Cited
U.S. PATENT DOCUMENTS 4,001,875 1/1977 Le Parquier ........................ 358/14
4,156,256 5/1979 Obremski ......................... 358/310

Primary Examiner—Michael A. Masinick
Attorney, Agent, or Firm—Thomas A. Briody; William J. Streeter; Edward W. Goodman

[57] ABSTRACT

A high definition color television transmission system in which wide band luminance information (Y, FIG. 1) is divided to produce a first luminance information portion (below 3.8 MHz) and a second luminance information portion (between 3.8 and 8.8 MHz). The first luminance information portion (Y1, FIG. 2) is transmitted by way of a first transmission path together with a color subcarrier ($f_{sc}$) modulated by color information. The bandwidth of the color information is such that the modulation components lie outside the bandwidth of the first luminance information portion. The second and higher frequency luminance information portion is frequency shifted to lie within 0 and 5 MHz (Y2, FIG. 3) and is transmitted by way of a second transmission path. The two transmissions may also carry sound signals ($f_{S1}$, FIG. 2; $f_{S2}$, FIG. 3). The two transmissions may be jointly received for the provision of a high definition display but the invention has the distinct advantage that the signal of the first transmission path may be received alone by currently manufactured television receivers for reproduction of a display of a quality which is currently acceptable.

9 Claims, 7 Drawing Figures

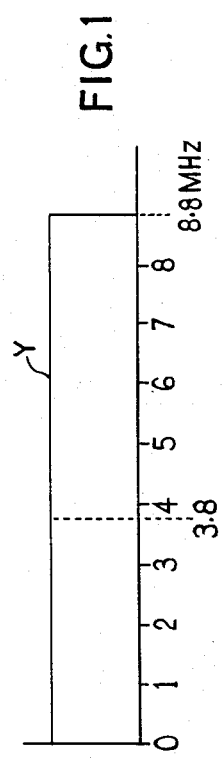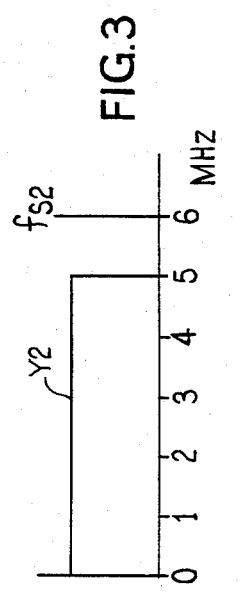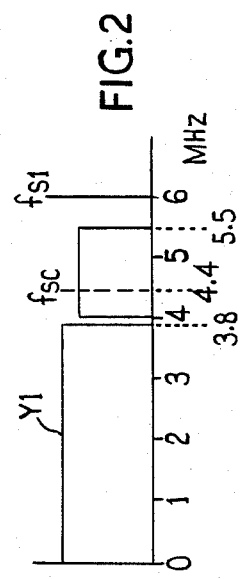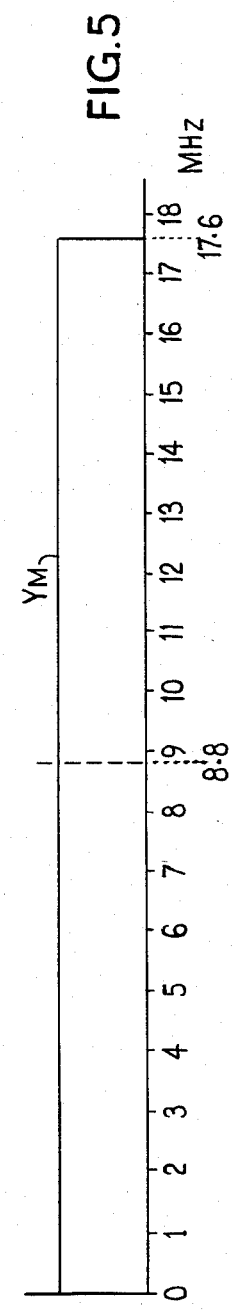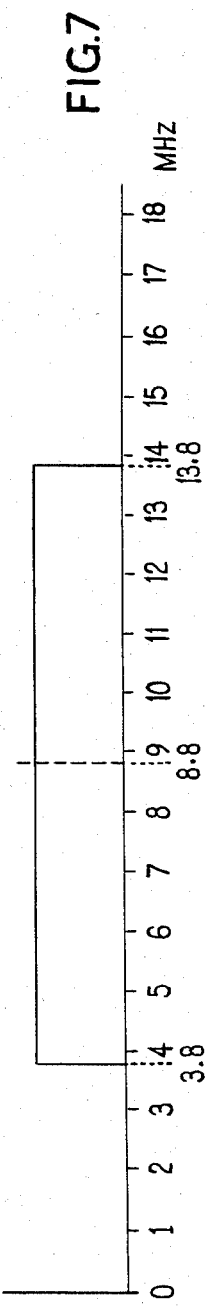

TELEVISION TRANSMISSION SYSTEM

BACKGROUND OF THE INVENTION

The invention relates to a high definition color television transmission system in which wide band luminance information is divided to produce a first luminance portion containing the lower frequency components of said luminance information and a second luminance portion containing the higher frequency components of said luminance information, the first luminance portion being transmitted by way of a first transmission path, the second luminance portion being frequency shifted such that the resulting frequency shifted second luminance portion lies within the bandwidth of a second transmission path, which bandwidth is substantially equal to that of the first transmission path, the frequency shifted second luminance portion being transmitted by way of the second transmission path. The invention also relates to television transmission equipment and television reception equipment for use with such a transmission system.

Such a transmission system has been disclosed in the book "Video Tape Recording" by Julian L. Bernstein, published by John F. Rider Publisher, Inc. New York, where in chapter 6, at page 94, it was proposed to divide a television signal into four parts of equal bandwidth and to frequency shift (heterodyne) the three higher frequency parts into the same frequency band as that occupied by the lowest part. The television signal with which this disclosure was concerned was a narrow band signal of 4 MHz bandwidth and was divided and frequency shifted so that it could be recorded on four separate tracks of a tape recorder. It would appear that the television signal in question would be for monochrome display, while from the tape speed, the four tracks would be recorded linearly along the tape. Since the publication of this book, considerable improvements have been made in video recording, though video tape recorders for analog signals still have a restriction on the bandwidth (a few MHz's) that can be recorded.

The color television signal currently transmitted by the broadcast authorities in the United Kingdom uses the PAL system with the transmissions taking place in the U.H.F. bands IV and V. In such transmissions, the luminance information has a bandwidth of 5.5 MHz with a color subcarrier located at a point nominally 4.43 MHz above the carrier frequency, the color subcarrier being modulated by the color information. Substantially all of the currently manufactured color television receivers do not fully utilize all the luminance information transmitted and in fact very little of the luminance information above 3.5 MHz is actually used for the production of the receiver's display. The luminance information above 3.5 MHz is reduced in magnitude to simplify the operation of decoding the color information and with such simplified decoding, cross-color interference would be observed on the display without such reduction. The quality of the display could be improved by using the whole of the luminance information transmitted, but this can only be obtained by a considerable increase in the cost of the receiver's circuitry handling the luminance information and separating it from the modulated color subcarrier.

Various suggestions have been made to further increase the bandwidth and hence the quality and definition, of transmitted color television signals. One such suggestion contemplates the transmission of a single sideband luminance modulated signal of 10 MHz bandwidth with the modulated color subcarrier being located in the other sideband. Such a transmission could not readily be currently transmitted in the U.H.F. bands IV or V as the required bandwidth would overlap into an adjacent channel. In addition, such a transmission could not be received by television receivers currently manufactured and would thus only be receivable by specially constructed receivers. A further suggestion proposed by NHK (Japan Broadcasting Corporation) in their NHK Laboratories Note, Ser. No. 239, August 1979, contemplates the separate transmission of luminance and color information in separate channels and suffers from similar objections to those above.

SUMMARY OF THE INVENTION

It is an object of the present invention to provide a high definition color television transmission system which besides being capable of being received by high quality reception equipment can also be received, albeit without the same quality, by currently manufactured color television receivers.

The invention provides a high definition color television transmission system in which wide band luminance information is divided to produce a first luminance portion containing the lower frequency components of said luminance information and a second luminance portion containing the higher frequency components of said luminance information, the first luminance portion being transmitted by way of a first transmission path, the second luminance portion being frequency shifted such that the resulting frequency shifted second luminance portion lies within the bandwidth of a second transmission path, which bandwidth is substantially equal to that of the first transmission path, the frequency shifted second luminance portion being transmitted by way of the second transmission path, characterised in that said first luminance portion has a bandwidth which is narrower than that of said second luminance portion while a color subcarrier modulated by color information is also transmitted by way of said first transmission path, the color subcarrier being located outside the bandwidth of said first luminance portion but within the bandwidth of said first transmission path, the system being such that the transmissions from the first and second transmission paths may be received together and the first and second luminance portions of the luminance information recombined for reproduction as a high definition color television display, or the transmission from the first transmission path may be received alone for reproduction as a color television display of acceptable quality as herein defined.

By the expression "a color television picture of acceptable quality" we mean one which approaches the quality as produced by the average domestic color television receiver as presently available of a corresponding display screen size when viewed at a typical viewing distance appropriate to the screen size.

The frequency shifted second luminance portion may be frequency inverted with respect to the second luminance portion.

The transmission paths may comprise synchronized respective first and second radio frequency television transmission channels having different carrier frequencies. Alternatively, the first and second transmission paths may be two record/reproduce channels of video recorder apparatus capable of simultaneously recording or playing back two separate signals. Where the first and second transmission paths are the record/reproduce channels of two separate respective video tape recorders, these recorders may be controlled to ensure synchronization between each other.

The invention also provides television transmission equipment for use with the above high definition television transmission system comprising means for providing wide band luminance information, means for filtering said first luminance portion containing the lower frequency components from said luminance information, means for adding the color subcarrier, modulated by color information, to said first luminance portion, means for applying the combined first luminance portion and color subcarrier to said first transmission path, means for frequency shifting said second luminance portion containing the higher frequency components of said luminance information to produce the frequency shifted second luminance portion which lies within the bandwidth of said second transmission path, and means for applying said frequency shifted second luminance portion to said second transmission path. Where the frequency shifted second luminance portion is frequency inverted with respect to the second luminance portion, the means for frequency shifting said second luminance portion may comprise means for applying said wide band luminance information to a first low-pass filter having a cut-off frequency at or below twice the frequency of said color subcarrier, means for applying said filtered luminance information to a mixer stage, means for applying a signal of twice the frequency of said color subcarrier to said mixer stage, and means for applying the resulting heterodyned signal to a second low-pass filter having a cut-off frequency equal to the difference between the cut-off frequency of the first low-pass filter and the bandwidth of said first luminance portion.

The invention further provides television reception equipment for use with the above high definition color television transmission system comprising means for receiving the transmission by way of the first transmission path and for producing therefrom the first luminance portion containing the lower frequency components of said luminance information and said color information, means for receiving the transmission by way of the second transmission path and for producing therefrom the frequency shifted second luminance portion, means for producing from the frequency shifted second luminance portion the said second luminance portion containing the higher frequency components of said luminance information, and means for combining said lower and higher frequency components to reform said wide band luminance information. Where the frequency shifted second luminance portion is frequency inverted with respect to the second luminance portion the means for producing said second luminance portion from said frequency shifted second luminance portion may comprise means for applying said frequency shifted second luminance portion to a mixer stage, means for applying a signal of twice the frequency of said color subcarrier to said mixer stage, and means for applying the resulting heterodyned signal to a low pass filter having a cut-off frequency at or below twice the frequency of said color sub-carrier.

DESCRIPTION OF THE DRAWINGS

The above and other features of the invention will be more readily understood from the following description, by way of example, having reference to the accompanying drawings, in which:

FIG. 1 is a graph of a wide band luminance information signal;

FIGS. 2 and 3 are graphs of the components of a color television transmission system according to the invention;

FIG. 5 is a graph for explaining the operation of the transmission equipment of FIG. 4;

FIG. 7 is a graph for explaining the operation of the reception equipment of FIG. 6.

DESCRIPTION OF THE PREFERRED EMBODIMENT

Figures 4, 6:
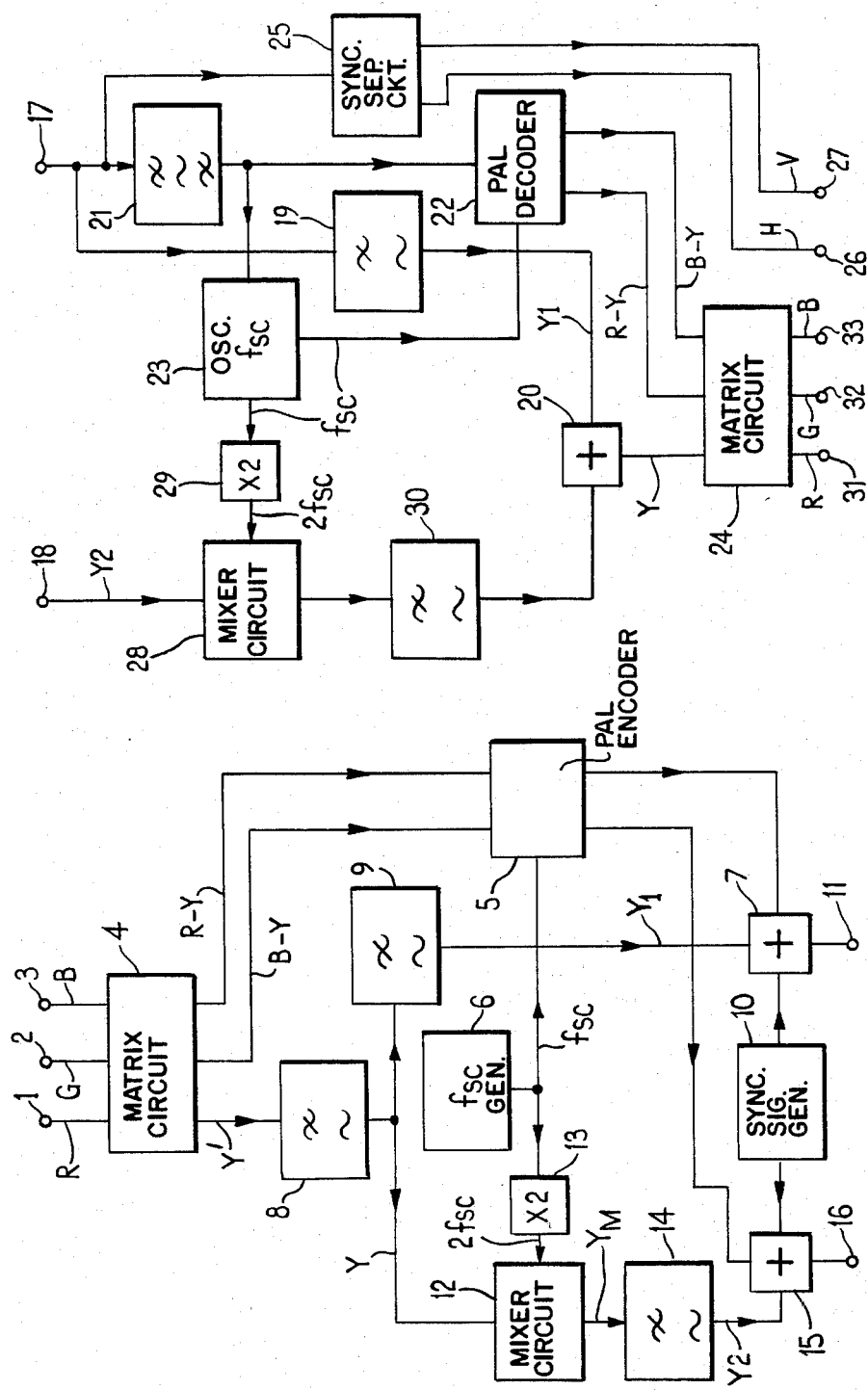
FIG. 4 is a block diagram of a television transmission equipment according to the invention.
FIG. 6 is a block diagram of television reception equipment according to the invention.

In FIG. 1 there is shown, in idealized form, the frequency characteristic of a wide band luminance information signal Y for a high definition television system. As will be seen from this Figure, the bandwidth of the luminance information Y is 8.8 MHz which is over 3 MHz wider than that transmitted with color television signals in the United Kingdom, and most other countries and more than twice the bandwidth of the luminance information actually utilized in the majority of currently manufactured color television receivers. It is considered that a bandwidth of 8.8 MHz is sufficient to give a marked improvement in the quality of a display obtained from the information and is sufficiently improved for it to be termed high definition in contrast with displays obtained with current television receivers. The choice of 8.8 MHz (nominal) for the bandwidth is by way of example only, but such a frequency has advantages in the manufacture and operation of transmission and reception equipment as will become apparent from the description below of such equipment. A color television signal including luminance information of the above bandwidth cannot, however, be transmitted in the existing broadcast transmission channels of the U.H.F. bands $\overline{IV}$ and $\overline{V}$ in the United Kingdom or elsewhere as such a signal would occupy a bandwidth greater than that allocated to such channels. It would also not be possible to record such a signal on most analog video tape recorders as such recorders are not able to cope with such a large bandwidth.

With the present invention, the luminance information is effectively divided into two portions each of which may be transmitted within the bandwidth of the existing channels of the U.H.F. bands $\overline{IV}$ and $\overline{V}$ or may be recorded within the bandwidth of most analog video tape recorders. Division of the luminance information is such that a lower frequency portion up to 3.8 MHz is transmitted over a first transmission path such as a transmitted television channel or on a video tape recorder and the bandwidth of this first luminance portion is shown as Y1 in FIG. 2. FIG. 2 also shows that the color information is transmitted with the first portion of the luminance information on a color subcarrier $f_{sc}$ which is at the usual nominal frequency of 4.4 MHz, the modulation of the color information extending from just above the envelope for the first portion of the luminance information Y1 up to 5.5 MHz. For the United Kingdom and those countries using the PAL color television system, the method of modulating the color information would be as per that system but in countries using other systems such as N.T.S.C. or S.E.C.A.M., then the method of modulation would be as per those other systems. FIG. 2 also shows that in the broadcast application, a sound carrier $f_{S1}$ is transmitted at 6 MHz in the normal manner which in the United Kingdom would be frequency modulated. The remaining and second (higher frequency) portion of the luminance information between 3.8 and 8.8 MHz is frequency shifted such that this upper 5 MHz occupies a bandwith of 0-5 MHz for transmission over a second transmission path, this bandwidth being substantially the same as that for the transmission over the first path. Such a signal is shown in FIG. 3 at Y2, which Figure also shows, for the broadcast application, the transmission of a second sound channel $f_{S2}$ also located at the 6 MHz point and modulated in the same manner as before. When the transmission paths are video tape recorders, the sound signals S1 and S2 would be recorded on separate tape tracks in the usual manner. In this way, the two transmissions may provide two sound signals either for stereo or bi-lingual reception. The luminance portion Y2 shown in FIG. 3 may be frequency inverted with respect to the portion contained above 3.8 MHz as shown in FIG. 1.

By dividing the luminance information for transmission by way of two transmission paths in the manner described above, the advantage is obtained that both transmissions may be received together and the resulting portions of the luminance information added together, following the necessary processing, to reform the wide band luminance information. In addition, the color information is transmitted outside the bandwidth occupied by luminance information and thus the separation of the color and luminance information may be simplified without any resulting display showing cross-color interference. The system, however, has a particular additional advantage in that it is compatible with current color television transmissions in that one of the transmissions, namely that shown in FIG. 2, may be received and displayed on a color television of current manufacture where luminance information above about 3.5 MHz in fact contributes little for display purposes and thus the transmission of FIG. 2 would produce a display of a quality corresponding to the currently produced by such receivers.

FIG. 4 shows a block diagram of television transmission equipment for use with the present transmission system. In FIG. 4 terminals 1, 2 and 3, respectively, receive red (R), green (G) and blue (B) color signals such as those produced by a high definition color television camera. These color signals are applied to a matrix circuit 4 which produces three outputs, the first of which is a luminance signal Y' while the remaining two are, respectively, color difference signals R-Y and B-Y. The color difference signals are applied to a PAL encoder circuit 5 to which oscillations at the color subcarrier frequency $f_{sc}$ (nominally 4.4 MHz) are applied from an oscillation generator 6, and the resulting color subcarrier modulated by the color difference signals is applied, from a first output of the PAL encoder circuit 5 together with the color burst, to the first input of an adder circuit 7. The luminance signal Y' from the matrix circuit 4 may have a bandwidth greater than 8.8 MHz and so this luminance signal is applied through a low pass filter 8 having a cut-off frequency of 8.8 MHz and the resulting signal is the wide band luminance information signal Y as shown in FIG. 1. The signal Y is applied through a second low-pass filter 9, which has a cut-off frequency of 3.8 MHz, to produce the first (lower frequency) portion of the luminance information Y1 shown in FIG. 2, this first portion being applied to the second input of the adder circuit 7. The third input of the adder circuit 7 receives line and field synchronizing signals from a generator 10, and the output of the adder circuit 7 produces a composite television signal which includes the luminance and modulated color information portions as shown in FIG. 2, this being applied to a terminal 11 for transmission by way of a first transmission path.

The wide band luminance information Y is also applied to a mixer circuit 12, which receives at a second input a signal of twice the frequency of the color subcarrier, that is at a (nominal) frequency of 8.8 MHz, from a frequency multiplier circuit 13 which itself receives a signal at the color subcarrier frequency $f_{sc}$ from the oscillation generator 6. The mixer circuit 12 produces an 8.8 MHz carrier about which is modulated the wide band luminance information, the resulting signal $Y_M$ being shown in FIG. 5, and from this Figure it will be appreciated that in the lower sideband, frequency inversion has taken place. The modulated signal $Y_M$ is applied to a low-pass filter 14 having a cut-off frequency of 5 MHz to produce at its output the signal Y2 shown in FIG. 3 where the signal at zero frequency represents the luminance component at 8.8 MHz of the information shown in FIG. 1, while the signal at 5 MHz represents the component at 3.8 MHz. The output of the low-pass filter 14 (to which the required d.c. component is added) is applied to a first input of a second adder circuit 15 a second input of which receives the line and field synchronizing signals from the generator 10. A third input of the adder circuit 15 receives the color burst of color subcarrier frequency $f_{sc}$ from a second output of the PAL encoder circuit 5 for synchronization purposes. The output of the adder circuit 15 is a composite television signal including the second (higher frequency) luminance information portion Y2, this being applied to a terminal 16 for transmission by way of a second transmission path.

From FIG. 4 it will be appreciated why the frequency of 8.8 MHz has been chosen for the bandwidth of the wide band luminance information as this frequency is twice that of the color subcarrier which makes it convenient to use this frequency as the carrier for the modulated signal from the mixer circuit 12, though at the same time place a limit on the bandwidth.

FIG. 6 shows an embodiment of television reception equipment for the reception of signals transmitted by the transmission equipment of FIG. 4. The reception equipment of FIG. 6 has two inputs 17 and 18 which, respectively, receive over separate transmission paths the signals, respectively, present at terminals 11 and 16. As explained with reference to FIG. 4, both of these signals contain the burst at color subcarrier frequency and this together with the line and field synchronizing signals, may be used to ensure accurate synchronization between the two signals appearing at terminals 17 and 18. This may be achieved using known techniques and it is assumed that the signals at these terminals have such synchronization. The signal at terminal 17 is applied to a low pass filter 19 having a cut-off frequency of 3.8 MHz such that its output is the first luminance information portion Y1 of FIG. 2, this information being applied to a first input of an adding circuit 20. The input at terminal 17 is also applied to a band-pass filter 21 having a passband between the frequencies 3.8 and 5.5 MHz and which thus produces at its output the modulated color subcarrier, which is applied to a first input of a PAL decoder circuit 22. This signal from filter 21 is also applied to a subcarrier regenerative oscillator 23 which produces oscillations at the subcarrier frequency $f_{sc}$ for application to a second input of the PAL decoder circuit 22. The PAL decoder circuit 22 produces two outputs which, respectively, convey the color difference signals R-Y and B-Y, which signals are applied to respective first and second inputs of a matrix circuit 24. The input at terminal 17 is also applied to a sync. separator circuit 25 which produces separated line (H) and field (V) synchronizing signals which are shown applied to terminals 26 and 27 for use in the production of the display in the usual manner.

The signal received at terminal 18 is applied to a first input of a mixer circuit 28, a second input of which receives a signal $2f_{sc}$ at twice the frequency of the subcarrier from a frequency multiplier circuit 29 which receives as its input the signal $f_{sc}$ from the subcarrier regenerative oscillator 23. The output of the mixer circuit 28 is the signal Y2 modulated on a carrier of twice the frequency of the subcarrier, this output being shown in FIG. 7 from which it will be seen that the portion of the Y2 signal transmitted between 0 and 5 MHz is frequency converted to lie as a lower side band between 3.8 MHz and 8.8 MHz and an upper side band which lies between 8.8 MHz and 13.8 MHz. This signal, is applied to a low-pass filter 30, having a cut-off frequency at 8.8 MHz, such that its output is the higher frequency portion of the wide band luminance Y, namely that shown above 3.8 MHz in FIG. 1. This signal is applied to a second input of the adder 20, the output of which is the reconstituted wide band luminance information signal Y of FIG. 1 and which is applied to a third input of the matrix circuit 24. The matrix circuit operates on the wide band luminance information Y and the color difference signals R-Y and B-Y to produce at respective output terminals 31, 32 and 33 color signals R, G and B. These color signals may then be applied to a high definition display tube to produce a high quality colour television display.

In the above discription of transmission and reception equipment no reference has been made to the way in which the sound signals S1 and S2 are added to or derived from the transmissions. This however, may be in known manner using known techniques.

We claim:

1. A high definition color television transmission system comprising means for dividing wide band luminance information into a first luminance portion containing lower frequency components of said luminance information and a second luminance portion containing higher frequency components of said luminance information, means for transmitting said first luminance portion by way of a first transmission path, means for frequency shifting said second luminance portion such that the resulting frequency-shifted second luminance portion lies within the bandwidth of a second transmission path which bandwidth is substantially equal to that of the first transmission path, and means for transmitting the frequency-shifted second luminance portion by way of the second transmission path, characterized in that said first luminance portion has a bandwidth which is narrower than that of said second luminance portion, while a color subcarrier modulated by color information is also transmitted by way of said first transmission path, the color subcarrier being located outside the bandwidth of said first luminance portion but within the bandwidth of said first transmission path, the system being such that the transmissions from the first and second transmission paths may be received together and the first and second luminance portions of the luminance information recombined for reproduction as a high definition color television display or the transmission from the first transmission path may be received alone for reproduction as a color television display of acceptable quality.

2. A color television transmission system as claimed in claim 1, in which the frequency-shifted second luminance portion is frequency inverted with respect to said second luminance portion.

3. A color television system as claimed in claim 1 or 2, in which said first and second transmission paths comprise respective first and second radio frequency television channels having different carrier frequencies.

4. A colour television transmission system as claimed in claim 1 or 2 in which said first and second transmission paths are a first and a second record/reproduce channel of video recorder apparatus.

5. A color television transmission system as claimed in claim 4, in which said first and second transmission paths are the record/reproduce channel of a first and a second video tape recorder, which recorders are controlled to ensure synchronization between the recorders.

6. Television transmission equipment for use with the high definition color television transmission system as claimed in claim 1, comprising means for providing wide band luminance information, means for filtering said first luminance portion containing the lower frequency components from said luminance information, means for adding the color subcarrier, modulated by color information, to said first luminance portion, means for applying the combined first luminance portion and the color subcarrier to said first transmission path, means for frequency shifting said second luminance portion containing the higher frequency components of said luminance information to produce the frequency-shifted second luminance portion which lies within the bandwidth of said second transmission path, and means for applying said frequency-shifted second luminance portion to said second transmission path.

7. Television transmission equipment as claimed in claim 6, wherein the frequency-shifted second luminance portion is frequency inverted with respect to said second luminance portion, and in which said means for frequency shifting said second luminance portion comprises means for applying said wide band luminance information to a first low-pass filter having a cut-off frequency at or below twice the frequency of said color subcarrier, means for applying said filtered luminance information to a mixer stage, means for applying a signal of twice the frequency of said color subcarrier to said mixer stage, and means for applying the resulting heterodyned signal to a second low-pass filter having a cut-off frequency equal to the difference between the cut-off frequency of the first low-pass filter and the bandwidth of said first luminance portion.

8. Television reception equipment for use with the high definition color television transmission system as claimed in claim 1, comprising means for receiving the transmission by way of the first transmission path and for producing therefrom the first luminance portion containing the lower frequency components of said luminance information and said color information, means for receiving the transmission by way of the second transmission path and for producing therefrom the frequency shifted second luminance portion, means for producing from the frequency shifted second luminance portion the said second luminance portion containing the higher frequency components of said luminance information, and means for combining said lower and higher frequency components to reform said wide band luminance information.

9. Television reception equipment as claimed in claim 8, wherein said frequency-shifted second luminance portion is frequency inverted with respect to said second luminance portion, and in which said means for producing said second luminance portion from said frequency-shifted second luminance portion comprises means for applying said frequency-shifted second luminance portion to a mixer stage, means for applying a signal of twice the frequency of said color subcarrier to said mixer stage, and means for applying the resulting heterodyned signal to a low-pass filter having a cut-off frequency at or below twice the frequency of said colour subcarrier.

* * * * *